(12) United States Patent
Shibano

(10) Patent No.: US 8,739,847 B2
(45) Date of Patent: Jun. 3, 2014

(54) HEAVY DUTY TIRE

(75) Inventor: Keizo Shibano, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 444 days.

(21) Appl. No.: 13/045,569

(22) Filed: Mar. 11, 2011

(65) Prior Publication Data

US 2011/0259494 A1  Oct. 27, 2011

(30) Foreign Application Priority Data

Apr. 27, 2010  (JP) ................................. 2010-102423

(51) Int. Cl.
  *B60C 11/11* (2006.01)
  *B60C 11/12* (2006.01)
  *B60C 11/13* (2006.01)

(52) U.S. Cl.
  USPC ............ 152/209.22; 152/209.18; 152/209.25; 152/902; 152/DIG. 3

(58) Field of Classification Search
  CPC .......................... B60C 11/0309; B60C 11/1369
  USPC .................. 152/209.22, 209.18, 209.25, 902, 152/DIG. 3
  See application file for complete search history.

(56) References Cited

U.S. PATENT DOCUMENTS

| 4,296,789 | A | * | 10/1981 | Roberts et al. | ............ 152/209.18 |
| 4,690,189 | A | * | 9/1987 | Bradisse et al. | ......... 152/209.15 |
| 4,913,208 | A | * | 4/1990 | Anderson et al. | ........ 152/209.18 |
| 5,658,404 | A | * | 8/1997 | Brown et al. | .............. 152/209.8 |
| 6,003,575 | A | * | 12/1999 | Koyama et al. | .......... 152/209.18 |
| 6,220,322 | B1 | * | 4/2001 | Matsuura | ................. 152/209.22 |
| 2007/0012389 | A1 | * | 1/2007 | Ito | ............................. 152/209.22 |

FOREIGN PATENT DOCUMENTS

| EP | 0602989 | * | 6/1994 |
| JP | 11-180112 A | | 7/1999 |
| JP | 2002-337514 A | | 11/2002 |

\* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A heavy duty tire comprises a tread portion provided with a central circumferential groove, a crown circumferential groove on each side thereof and crown axial grooves extending therebetween so as to for crown blocks. The crown block is circumferentially subdivides into two block pieces by a crown narrow groove. The crown axial groove is provided in the groove bottom with a tie bar rising therefrom and connecting the circumferentially adjacent two crown blocks each other. The crown axial grooves are inclined at an angle α of from 10 to 30 degrees with respect to the tire axial direction. The central circumferential groove and an axially inner part of the crown axial groove which part is axially inside the tie bar, are shallower than the crown circumferential groove.

11 Claims, 4 Drawing Sheets

HEAVY DUTY TIRE

BACKGROUND OF THE INVENTION

The present invention relates to a pneumatic tire, more particularly to a heavy duty tire provided with a block pattern capable of improving self-ejection of stones entrapped in tread grooves.

In the case of heavy duty tires for trucks and the like which are designed to be used on paved roads as well as unpaved roads for example gravel roads in construction fields, and provided in the tread portion with a block pattern in order to secure sufficient road grip on the unpaved roads, there is a tendency such that stones or small solid objects on the roads are entrapped in the tread grooves.

If the entrapped stone remains in the tread groove and hits the groove bottom repeatedly during running, there is a possibility that the groove bottom as well as the underlying tread reinforcing cord layer are damaged and thereby the durability of the tread portion is deteriorated. Thus, there is a problem such that the retreadable rate of the used tires decreases.

Therefore, in order to prevent stone entrapment, hitherto adopted techniques are:

(a) to incline the sidewalls of a tread groove so that the groove width gradually increases from the groove bottom to the open top for example as disclosed in Japanese patent application publication JP-2002-337514-A;
(b) to form a tread groove as including independent platforms raised from the groove bottom for example as disclosed in Japanese patent application publication JP-11-180112-A; and
(c) to decrease the open top width of a tread groove.

In the case of the technique (a), however, on the premise that the open top width of the groove is not to be changed, the groove bottom width decreases as the inclination of the sidewalls increases. Therefore, it becomes difficult to form the groove bottom (in cross section) with a large arc. As a result, in the groove bottom, due to deformation repeated during running, cracks are liable to occur.

In the case of the technique (b), in order to form the independent platforms, relatively wide groove width is required in the groove bottom, therefore, it becomes difficult to incline the sidewalls of the groove so that the stone is easily ejected.

In the case of the technique (c), the wet performance (drainage) tends to deteriorate.

SUMMARY OF THE INVENTION

It is therefore, an object of the present invention to provide a heavy duty tire, in which in order to prevent damage to the groove bottom and underlying tread reinforcing cord layer, self-ejection of entrapped stones is improved without causing cracks in the groove bottom and the decrease in the wet performance.

According to the present invention, a heavy duty tire comprises a tread portion provided with
a central circumferential groove disposed along the tire equator,
a crown circumferential groove disposed on each side of the central circumferential groove,
crown axial grooves extending from the central circumferential groove to the crown circumferential groove so that a part therebetween is circumferentially divided into crown blocks,
a crown narrow groove disposed on the crown block so as to extend from the central circumferential groove to the crown circumferential groove to circumferentially subdivide the crown block into two block pieces, and
a tie bar disposed in the crown axial groove and rising from the groove bottom to connect the circumferentially adjacent two crown blocks each other, wherein
the crown axial grooves are inclined at an angle $\alpha$ of from 10 to 30 degrees with respect to the tire axial direction,
the central circumferential groove has a depth less than the depth of the crown circumferential groove, and
an axially inner part of the crown axial groove which part is axially inside the tie bar, has a depth less than the depth of the crown circumferential groove.

In the tread crown region, the ground pressure is relatively high and the possibility of being damaged by entrapped stones is also relatively high. Therefore, the crown axial grooves in the tread crown region are inclined at the angle $\alpha$. As a result, the entrapped stones are easily moved during running, along the direction of the crown axial groove.

Further, since the crown block is circumferentially subdivided into the two block pieces by the crown narrow groove, during running, the block pieces can move in the tire circumferential direction while changing the groove width of the crown axial grooves. As a result, due to synergetic effect of the change in the groove width and the inclination of the crown axial grooves, the stones entrapped in the axial grooves are easily ejected.

However, if the block pieces are excessively moved, so called heel-and-toe wear is liable to occur on the crown block. Therefore, in order to provide support for the lower part of the block pieces and prevent the excessive movements of the block pieces, the crown axial groove is provided with the tie bar.

Further, the central circumferential groove and the axially inner parts of the crown axial grooves are made shallower than the crown circumferential groove. In other words, the tread rubber thickness at the groove bottom is increased. Therefore, even if the entrapped stone is hard to be self-ejected, due to the increased rubber thickness, the damage to the underlying tread reinforcing cord layer can be avoided, and the durability of the tread portion and the retreadable rate of the used tires can be increased.

DESCRIPTION OF THE PREFERRED EMBODIMENTS

Figure 1:
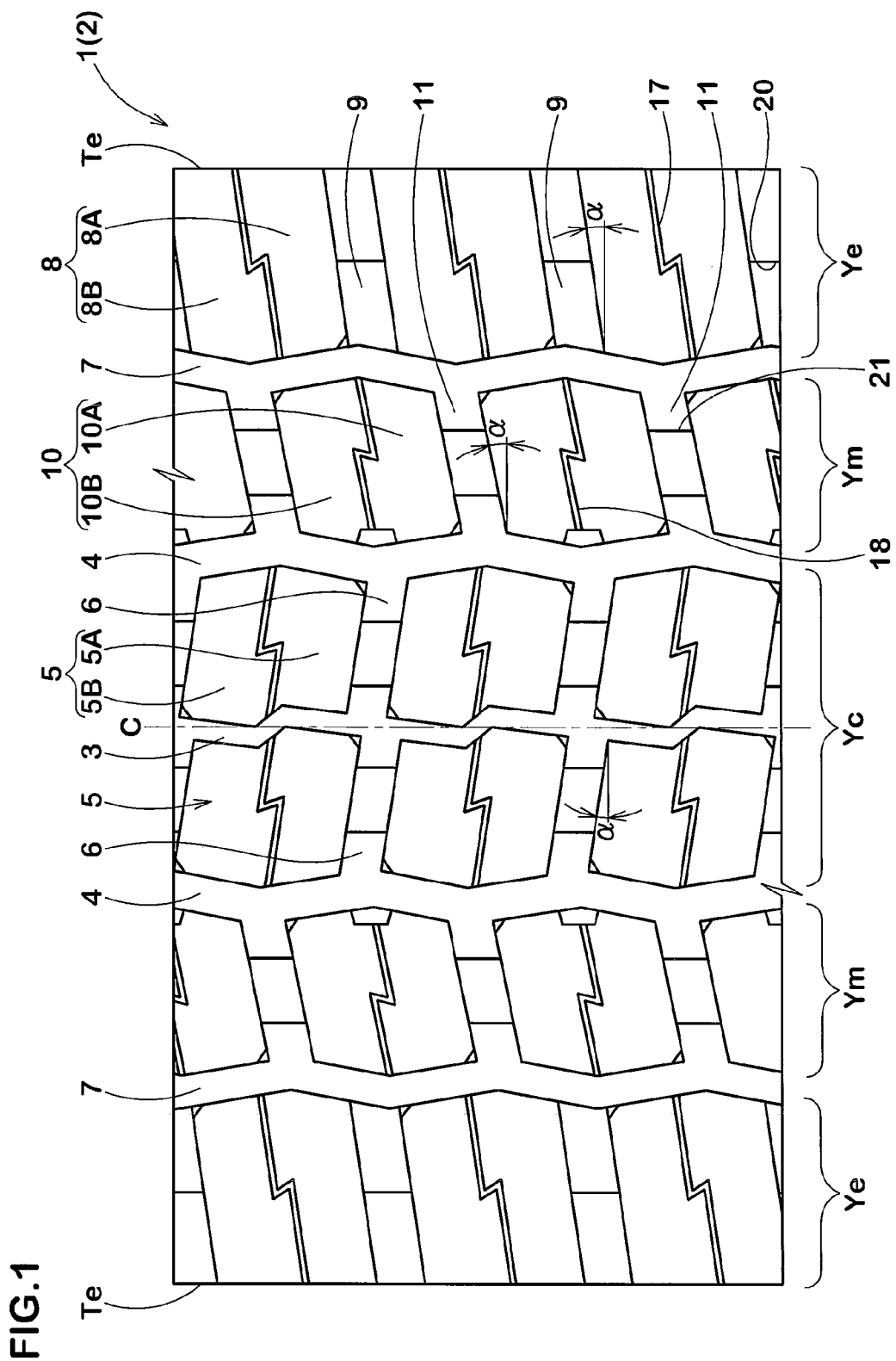
FIG. 1 is a developed view showing an example of the tread pattern of the heavy duty tire according to the present invention.

Embodiments of the present invention will now be described in detail in conjunction with accompanying drawings.

In the drawings, heavy duty tire 1 according to the present invention comprises a tread portion 2 defining a tread surface 25 and provided with:
a central circumferential groove 3 extending along the tire equator C;
a crown circumferential groove 4 disposed on each side of the central circumferential groove 3; and
crown axial grooves 6 extending from the central circumferential groove 3 to the crown circumferential grooves 4 so that a tread crown region Yc, which is defined between the two crown circumferential grooves 4, is divided into a plurality of crown blocks 5 in two circumferential rows each located between the central circumferential groove 3 and one of the crown circumferential grooves 4.

In this embodiment, the tread portion 2 is further provided with:
a shoulder circumferential groove 7 disposed axially outside each of the crown circumferential grooves 4;
shoulder axial grooves 9 extending from the shoulder circumferential groove 7 to the adjacent tread edge Te so that a tread shoulder region Ye, which is defined between the shoulder circumferential groove 7 and the adjacent tread edge Te, is divided into shoulder blocks 8; and
middle axial grooves 11 extending from the shoulder circumferential groove 7 to the adjacent crown circumferential groove 4 so that a tread middle region Ym, which is defined between the shoulder circumferential groove 7 and the crown circumferential groove 4, is divided into middle blocks 10.

Accordingly, the tread portion 2 in this embodiment is provided on each side of the tire equator C with a row of the crown blocks 5 arranged along the tire equator c, a row of the shoulder blocks 8 arranged along the tread edge Te, and a row of the middle blocks 10 arranged therebetween. Therefore, a total of six rows constitute a block pattern in the tread portion.

Figure 3A:
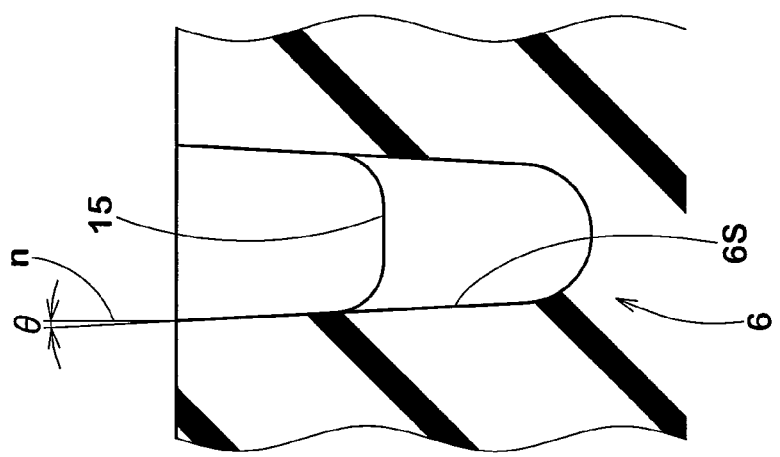
FIG. 3(A) is a cross sectional view of a central circumferential groove taken along a direction perpendicular to the longitudinal direction thereof.
Figure 3B:
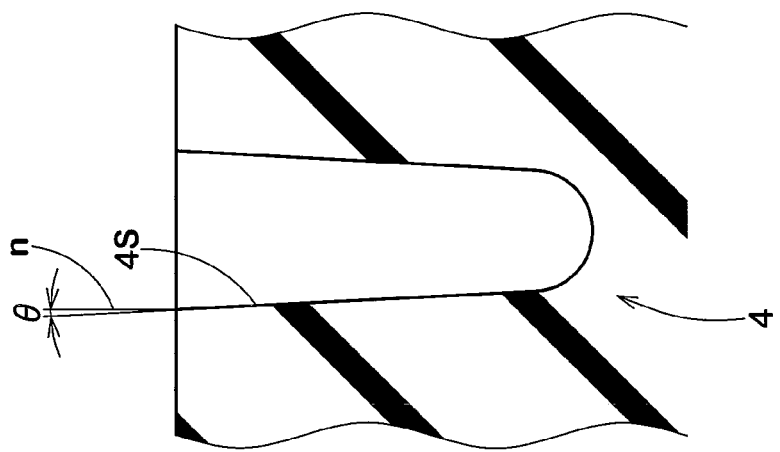
FIG. 3(B) is a cross sectional view of a crown circumferential groove taken along a direction perpendicular to the longitudinal direction thereof.
Figure 3C:
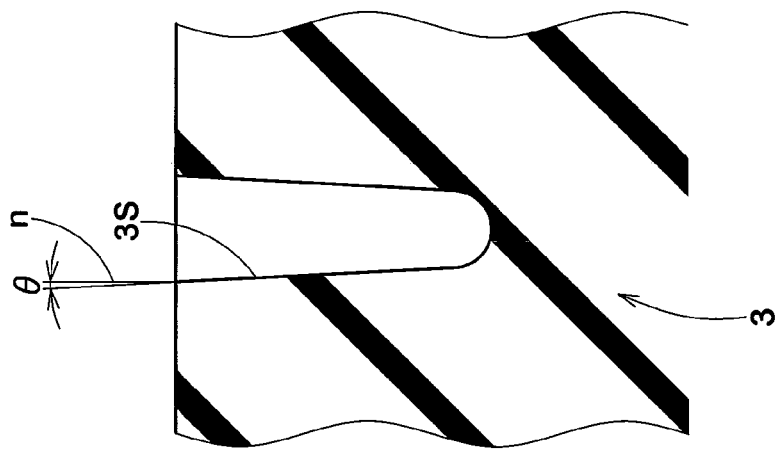
FIG. 3(C) is a cross sectional view of a crown axial groove taken along a direction perpendicular to the longitudinal direction thereof.

FIGS. 3(A), 3(B) and 3(C) shows cross sections of the central circumferential groove 3, crown circumferential groove 4 and crown axial groove 6, respectively, which are taken perpendicularly to the respective groove length directions.

In this embodiment, as shown,
the sidewalls 3S of the central circumferential groove 3, the sidewalls 4S of the crown circumferential groove 4 and the sidewalls 6S of the crown axial groove 6 each have an angle θ of not more than 3 degrees with respect to the normal direction to the tread surface 2S.
This results in a groove volume large for the groove open width, and leads to improved wet performance (drainage) and road grip.

In the present invention, in order to control stone entrapment in the tread crown region Yc, the crown axial grooves 6 are inclined at an angle α of from 10 to 30 degrees with respect to the tire axial direction as shown in FIG. 1. This, during running, induces axial movements (along the inclination) of stones entrapped in the crown axial grooves 6, which helps to improve self-ejection of the entrapped stones.

Figure 2:
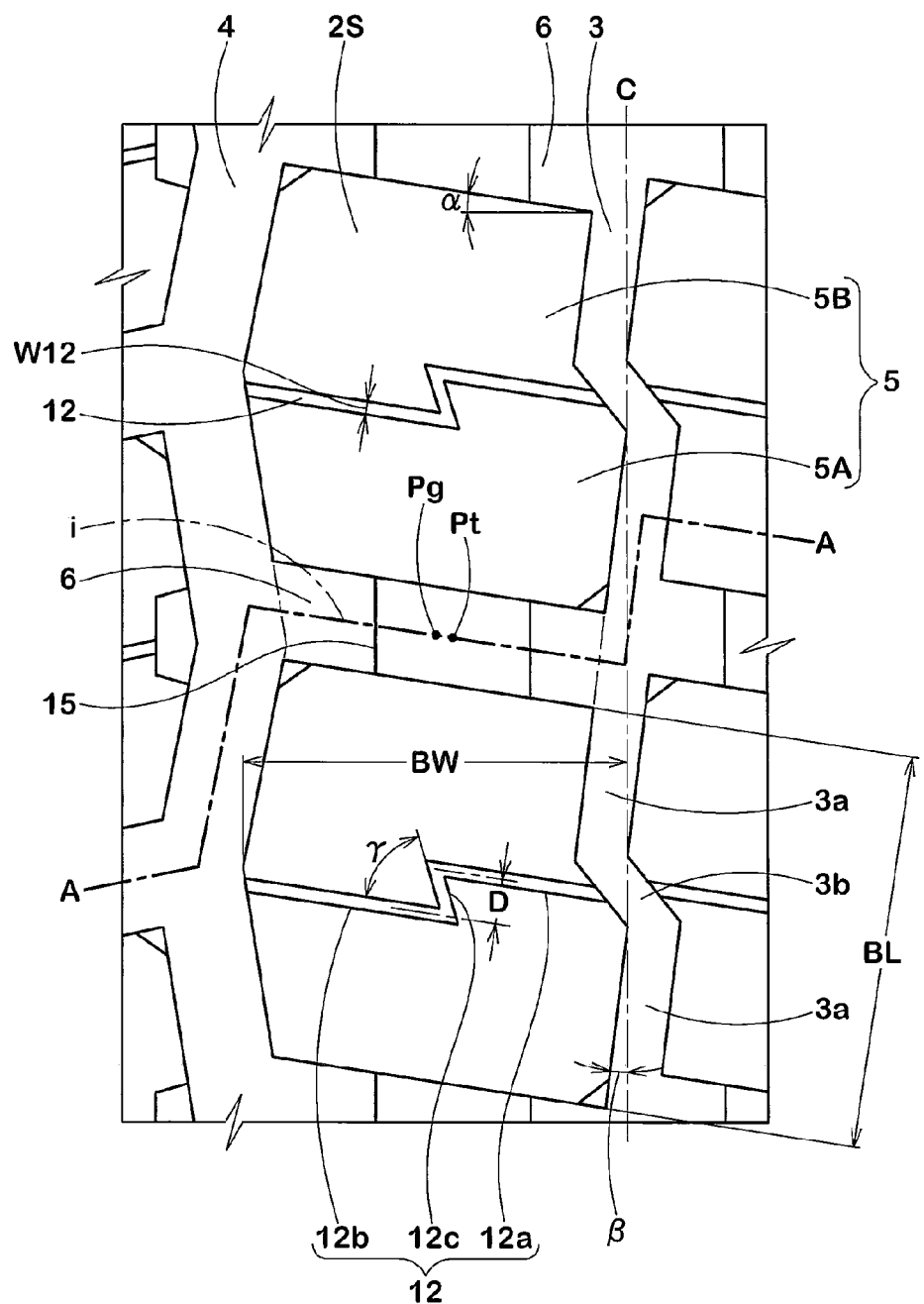
FIG. 2 is an enlarged view of a main part thereof.

As shown in FIG. 2, each of the crown blocks 5 is provided with a crown narrow groove 12 which extends from the central circumferential groove 3 to the crown circumferential groove 4 so as to circumferentially subdivide the crown block 5 into two block pieces 5A and 5B. The crown block is provided with no other groove (inclusive of sipe).

The crown narrow groove 12 is defined as having a groove width w12 in a range of from 0.5 to 1.0 mm at the tread surface 2S.

Due to the formation of the crown narrow groove 12, it becomes easier for the block pieces 5A and 5B to move toward or against the adjacent crown axial grooves 6 during running, and accordingly, the groove width of the crown axial groove 6 is varied every time when the grooved part of the tread contacts with the ground.

Therefore, due to synergetic effect of this and the above-described inclination of the crown axial groove 6, the self-ejection of entrapped stones can be further improved. If the angle α is less than 10 degrees, it becomes difficult to obtain such synergetic effect. If the angle α is more than 30 degrees, it becomes difficult to obtain the required road grip performance.

However, if the block pieces 5A and 5B are moved excessively, then so called heel-and-toe wear is liable to occur on the heel-side edge and toe-side edge of the crown block 5. Therefore, the crown axial grooves 6 are each provided with a tie bar 15.

The tie bar 15 rises from the groove bottom and extends between the adjacent two crown blocks 5 so as to connect these blocks each other. Therefore, movements of the block pieces 5A and 5B toward or against the crown axial grooves 6 are restrained, and the heel-and-toe wear resulting from the crown narrow grooves 12 can be minimized.

The tie bar 15 in this embodiment is disposed such that an axial center position Pt of the tie bar 15 is positioned on the tire equator C side of an axial center position Pg of the crown axial groove 6.
Thereby, the block pieces 5A and 5B are provided with more support on the tire equator side than the tread edge side (the ground pressure is higher on the tire equator side than the tread edge side) and the effect of the tie bar 15 to control the heel-and-toe wear can be increased without increasing the size of the tie bar 15, namely, without decreasing the groove volume. Here, the axial center position Pt of the tie bar 15 is that of the radially outer surface of the tie bar 15 on the widthwise center line (i) of the crown axial groove 6.
The axial center position Pg of the crown axial groove 6 is that of the top opening of the crown axial groove 6 on the widthwise center line (i) of the crown axial groove 6.

Figure 4:
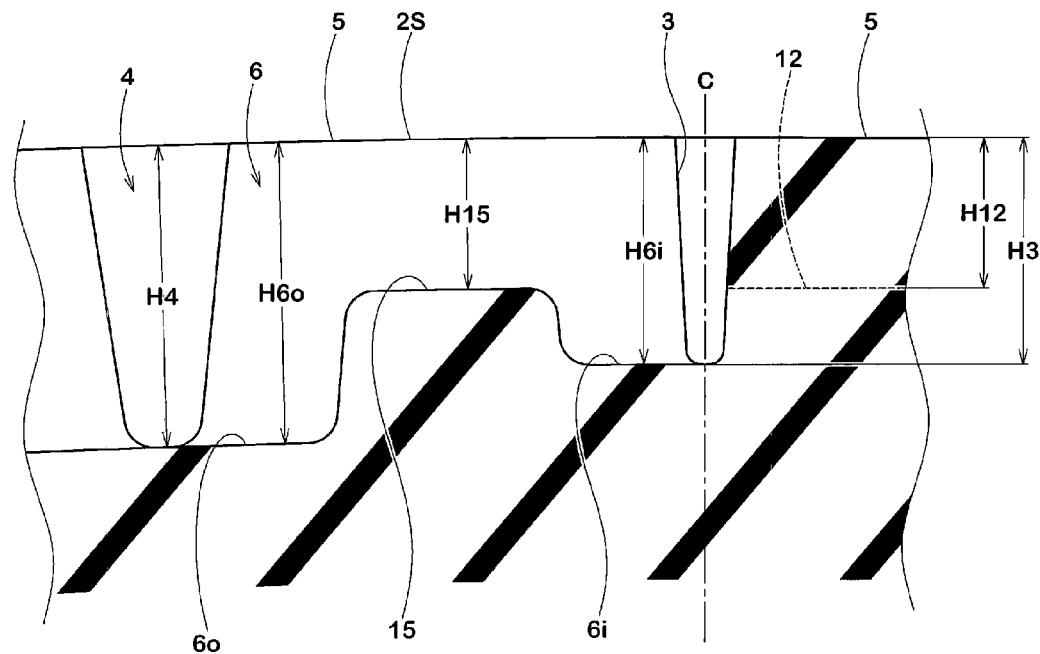
FIG. 4 is a cross sectional view taken along line A-A of FIG. 2.

In the present invention, as shown in FIG. 4, the groove depth H3 of the central circumferential groove 3 and the groove depth H6$i$ of an axially inner part 6$i$ of the crown axial groove 6 which part is axially inside the tie bar 15 are set to be less than the groove depth H4 of the crown circumferential groove 4. Therefore, in the corresponding part of the tread rubber where stone entrapment is liable to occur and thereby there is a risk of causing damage to the underlying tread reinforcing cord layer (belt, band and breaker), the rubber thickness from the groove bottom to the tread reinforcing cord layer is increased, and the damage to the tread reinforcing cord layer can be prevented, For that purpose, it is preferable that the groove depth differences (H4−H3) and (H4−H6$i$) are not less than 5.0 mm but not more than 9.0 mm.
If more than 9.0 mm, it becomes difficult to maintain the necessary drainage performance. If less than 5.0 mm. it is difficult to provide a sufficient effect to prevent the damage of the tread reinforcing cord layer.

In this embodiment, the groove depth H6$o$ of an axially outer part 6$o$ of the crown axial groove 6 which part is axially outside the tie bar 15 is set to be more than the groove depth H6$i$ of the above-mentioned axially inner part 6$i$.
Thereby, the motions of the block pieces 5A and 5B are provided with irregularities, which helps to improve self-ejection of the entrapped stones.
Preferably, the groove depth H6$o$ of the axially outer part 6$o$ is not more than the groove depth H4 of the crown circumferential groove 4.

More preferably, the groove depth H6o is the same as the groove depth H4 of the crown circumferential groove 4, and the groove depth H6i is the same as the groove depth H3 of the central circumferential groove 3. Thereby, it is possible to minimize the concentration of strain at the groove bottom.

The tie bar depth H15 (namely depth of the tie bar 15 from the tread surface 25) and the groove depth H12 of the crown narrow groove 12 are preferably set in a range of from 40 to 60% of the groove depth H4 of the crown circumferential groove 4.

If the tie bar depth H15 or the groove depth H12 is more than 60% of the groove depth H4, then the motions of the block pieces 5A and 5B becomes increased and it becomes difficult to control the occurrence of the heel-and-toe wear.

If the tie bar depth H15 or the groove depth H12 is less than 40% of the groove depth H4, then the self-ejection becomes insufficient.

It is therefore, more preferable that, when one of the tie bar depth H15 and the groove depth H12 is in a range of from 50 to 60% of the groove depth H4, the other is set in a range of from 40 to 50% of the groove depth H4.

In this embodiment, the groove depth H6o of the axially outer part 6o and the groove depth H4 of the crown circumferential groove 4 are about 18 to 25 mm, and the groove depth H3 of the central circumferential groove 3 and the groove depth H6i of the axially inner part 6i are more than the tie bar depth H15.

In order to further control the heel-and-toe wear, as shown in FIG. 2, the crown narrow groove 12 in this embodiment is formed in the form of "z". The crown narrow groove 12 is composed of a first main part 12a extending from the central circumferential groove 3, a second main part 12b extending from the crown circumferential groove 4 in substantially parallel with the first main part 12a, and a connecting part 12c connecting the inside ends of the first main part 12a and second main part 12b.

The internal angle γ between the connecting part 12c and the first main part 12a and the internal angle γ between the connecting part 12c and the second main part 12b are set in a range of not less than 45 degrees, but not more than 90 degrees, preferably not more than 80 degrees.

Therefore, the block pieces 5A and 5B can be engaged each other to control excessive circumferential movements thereof, and thereby the heel-and-toe wear can be lessened. The first and second main parts 12a and 12b are substantially parallel to the crown axial grooves 6, and preferably the distance D between the first and second main parts 12a and 12b is set in a range of from 2.0 to 10% of the block length BL of the crown block 5 measured perpendicularly to the crown axial groove 6.

From the viewpoint of the road grip and steering stability, it is desirable that the block length BL is set in a range of from 30 to 50 mm, and the axial maximum width BW (block width BW) of the crown block 5 is set in a range of from 30 to 40 mm.

In this embodiment, from the viewpoint of the road grip and stone entrapment, the central circumferential groove 3 is formed as a zigzag groove which is made up of
oblique main parts 3a inclined at an inclination angle β of from 1 to 15 degrees with respect to the tire circumferential direction, and
inflected parts 3b extending between the oblique main parts 3a and inclined at an inclination angle larger than the angle β with respect to the tire circumferential direction oppositely to the oblique main part 3a.
Such inflected parts 3b of the central circumferential groove 3 can improve the road grip and braking force.

In this embodiment, the above-mentioned crown narrow grooves 12 respectively intersect the inflected parts 3b of the central circumferential groove 3. Therefore, the stone entrapped in the inflected part 3b is easily moved and ejected. The stone entrapped in the oblique main part 3a and moved to the inflected parts 3b is easily ejected.

For the same reason, the crown axial grooves 6 each intersect with one of the oblique main parts 3a of the central circumferential groove 3.

As shown in FIG. 1, similarly to the tread crown region Yc, in the tread shoulder region Ye and tread middle region Ym too, the shoulder axial grooves 9 and middle axial grooves 11 are each inclined at an angle α of from 10 to 30 degrees with respect to the tire axial direction, and
the shoulder block 8 and the middle block 10 are provided with a shoulder narrow groove 17 and a middle narrow groove 18, respectively, to circumferentially subdivide the block 8 into two block pieces 8A and 8B, and the block 10 into two block pieces 10A and 10B.

Therefore, the shoulder axial grooves 9 and middle axial grooves 11 are provide with the self-ejecting function.

In order to restrain heel-and-toe wear of the shoulder blocks 8 and middle blocks 10, the shoulder axial grooves 9 and middle axial grooves 11 are provided with tie bars 20 and 21 rising from the respective groove bottoms and connecting the circumferentially adjacent two blocks (two shoulder blocks 8, two middle blocks 10) each other.

In the tread middle region Ym, in order to put a high priority on the drainage, the middle axial grooves 11 and shoulder circumferential grooves 7 are formed to have the same depth as the groove depth H4 of the crown circumferential groove 4.

In the tread shoulder region Ye, in order to put a high priority on the steering stability and uneven wear resistance, the shoulder axial grooves 9 are formed to have a shallower depth than the middle axial grooves 11, in this embodiment substantially same as the groove depth H6i of the axially inner part 6i of the crown axial groove 6, namely, in a range of from 0.9 to 1.1 times the groove depth H6i.

Comparison Tests

Heavy duty tires of size 11.00R20 (rim size 7.50×20) having the tread pattern shown in FIG. 1 and specifications shown in Table 1 were prepared and tested for stone entrapment, uneven wear resistance and drainage.

(1) Drainage Test:

A truck provided with test tires (tire pressure 725 kPa) was run on a wet road surface in a tire test course, and the wet grip performance was evaluated. The results are indicated by an index based on a comparative tire Ref. 1 being 100, wherein the larger the number, the better the wet grip performance.

(2) Stone Entrapment and Uneven Wear Resistance Test:

The truck was run for 1500 km (gravel road:paved road=approximately 2:1). Then the number of stones entrapped in the tread crown region was counted. The results are indicated by an index based on the comparative tire Ref. 1 being 100, wherein the larger the number, the better the stone entrapment.

Further, after the running for 1500 km, the heel-and-toe wear of the crown blocks were visually evaluated. The results are indicated by an index based on the comparative tire Ref. 1 being 100, wherein the larger the number, the better the uneven wear resistance.

As shown in Table 1, in the case of Embodiment tires Ex. 1-Ex. 6, due to the synergetic effect of inclining the crown axial grooves at the angle α, providing the crown narrow grooves for the crown blocks, providing the tie bars for the crown axial grooves and setting the depths H6i and H3 as smaller than the depth H4, the stone entrapment was improved, while maintaining or improving the wet performance and uneven wear resistance.

TABLE 1

| Tire | Ref. 1 | Ex. 1 | Ex. 2 | Ref. 2 | Ref. 3 | Ref. 4 | Ref. 5 | Ex. 3 | Ex. 4 | Ex. 5 | Ex. 6 |
|---|---|---|---|---|---|---|---|---|---|---|---|
| Crown circum. groove | | | | | | | | | | | |
| depth H4 (mm) | 20.4 | 20.4 | 20.4 | 20.4 | 20.4 | 20.4 | 20.4 | 20.4 | 20.4 | 20.4 | 20.4 |
| Central circum. groove | | | | | | | | | | | |
| depth H3 (mm) | 15.4 | 15.4 | 15.4 | 15.4 | 15.4 | 15.4 | 20.4 | 15.4 | 15.4 | 15.4 | 15.4 |
| (% of H4) | 75 | 75 | 75 | 75 | 75 | 75 | 100 | 75 | 75 | 75 | 75 |
| Crown axial groove | | | | | | | | | | | |
| angle α (deg.) | 0 | 10 | 30 | 40 | 10 | 10 | 10 | 10 | 10 | 10 | 10 |
| tie bar | | | | | non | | | | | | |
| depth H15 (mm) | 10.2 | 10.2 | 10.2 | 10.2 | — | 10.2 | 10.2 | 10.2 | 8.2 | 8.2 | 8.2 |
| (% of H4) | 50 | 50 | 50 | 50 | — | 50 | 50 | 50 | 40 | 40 | 40 |
| axially inner part | | | | | | | | | | | |
| depth H6i (mm) | 15.4 | 15.4 | 15.4 | 15.4 | 15.4 | 15.4 | 20.4 | 15.4 | 15.4 | 15.4 | 15.4 |
| (% of H4) | 75 | 75 | 75 | 75 | 75 | 75 | 100 | 75 | 75 | 75 | 75 |
| axially outer part | | | | | | | | | | | |
| depth H6o (mm) | 20.4 | 20.4 | 20.4 | 20.4 | 20.4 | 20.4 | 20.4 | 15.4 | 20.4 | 20.4 | 20.4 |
| (% of H4) | 100 | 100 | 100 | 100 | 100 | 100 | 100 | 75 | 100 | 100 | 100 |
| Crown narrow groove | | | | | | non | | | | | |
| depth H12 (mm) | 10.2 | 10.2 | 10.2 | 10.2 | 10.2 | — | 10.2 | 10.2 | 8.2 | 10.2 | 12.2 |
| (% of H4) | 50 | 50 | 50 | 50 | 50 | — | 50 | 50 | 40 | 50 | 60 |
| Test results | | | | | | | | | | | |
| Stone entrapment | 100 | 105 | 110 | 110 | 90 | 100 | 80 | 103 | 105 | 105 | 105 |
| Uneven wear resistance | 100 | 105 | 95 | 80 | 80 | 80 | 100 | 105 | 108 | 105 | 100 |
| Drainage | 100 | 105 | 110 | 115 | 105 | 95 | 105 | 95 | 95 | 100 | 100 |

The invention claimed is:

1. A heavy duty tire comprising
a tread portion provided with
a central circumferential groove disposed along the tire equator,
a crown circumferential groove disposed on each side of the central circumferential groove, and
a plurality of crown axial grooves disposed on each side of the central circumferential groove and extending axially from the central circumferential groove to said crown circumferential grooves so that portions between the central circumferential groove and the crown circumferential groove are circumferentially divided into crown blocks,
wherein
each of the crown blocks is provided with a single crown narrow groove extending from the central circumferential groove to the crown circumferential groove so as to circumferentially subdivide the crown block into two block pieces,
the crown axial grooves are each inclined at an angle α of from 10 to 30 degrees with respect to the tire axial direction,
the central circumferential groove is a zigzag groove consisting of alternate oblique main parts and inflected parts shorter than the oblique main parts,
the oblique main parts are each inclined at an angle β of from 1 to 15 degrees with respect to the tire circumferential direction,
the inflected parts are each inclined at an angle larger than the angle β oppositely to the oblique main parts with respect to the tire circumferential direction,
the inflected parts are each connected with one of the crown narrow grooves disposed on one side of the central circumferential groove and one of the crown narrow grooves disposed on the other side of the central circumferential groove,
the oblique main parts are each connected with one of the crown axial grooves disposed on one side of the central circumferential groove and one of the crown axial grooves disposed on the other side of the central circumferential groove,
the central circumferential groove has a depth less than the depths of the crown circumferential grooves,
the crown axial grooves are each provided therein with a tie bar rising from the bottom of the crown axial groove so as to connect the circumferentially adjacent two crown blocks to each other, and
the crown axial grooves each have an axially inner part which is axially inside the tie bar and has a depth less than the depth of the adjacent crown circumferential groove.

2. The heavy duty tire according to claim 1, wherein each of the crown axial grooves has an axially outer part which is axially outside the tie bar and deeper than said axially inner part of the crown axial groove.

3. The heavy duty tire according to claim 2, wherein
said axially outer part has the same depth as the adjacent crown circumferential groove, and
said axially inner part has the same depth as the central circumferential groove.

4. The heavy duty tire according to claim 3, wherein
an axial center of the tie bar provided in each said crown axial groove is positioned on the tire equator side of an axial center of the crown axial groove.

5. The heavy duty tire according to claim 2, wherein
an axial center of the tie bar provided in each said crown axial groove is positioned on the tire equator side of an axial center of the crown axial groove.

6. The heavy duty tire according to claim 1, wherein an axial center of the tie bar provided in each said crown axial groove is positioned on the tire equator side of an axial center of the crown axial groove.

7. The heavy duty tire according to claim 1, wherein the sidewalls of the central circumferential groove, the sidewalls of the crown circumferential groove and the sidewalls of the crown axial groove are inclined at angles θ of not more than 3 degrees with respect to the normal direction to the tread surface.

8. The heavy duty tire according to claim 1, wherein
the depth of said tie bar and the groove depth of said single crown narrow groove are in a range of from 40 to 60% of the groove depth of said crown circumferential groove.

9. The heavy duty tire according to claim 1, wherein said crown axial grooves are parallel straight grooves.

10. The heavy duty tire according to claim 9, wherein
each of the crown narrow grooves is formed in the form of "Z" and composed of a first main part extending from the central circumferential groove, a second main part extending from the crown circumferential groove in substantially parallel with the first main part, and a connecting part connecting the inside ends of the first main part and second main part, and the first and second main parts are substantially parallel with the circumferentially adjacent crown axial grooves.

11. The heavy duty tire according to claim 10, wherein the connecting part is shorter than the first main part and the second main part, and the internal angle γ between the connecting part and the first main part and the internal angle γ between the connecting part and the second main part are not less than 45 degrees and not more than 90 degrees.

* * * * *